United States Patent [19]

Herrington, Jr.

[11] 4,268,239
[45] May 19, 1981

[54] TUBULAR EXTRUSION DIE

[75] Inventor: F. John Herrington, Jr., Holcomb, N.Y.

[73] Assignee: Mobil Oil Corporation, New York, N.Y.

[21] Appl. No.: 97,769

[22] Filed: Nov. 27, 1979

Related U.S. Application Data

[63] Continuation of Ser. No. 910,395, May 30, 1978, abandoned.

[51] Int. Cl.³ .................................................. B29F 3/04
[52] U.S. Cl. .................................... 425/467; 425/380
[58] Field of Search ............ 425/467, 466, 380, 326.1, 425/72 R; 264/209

[56] References Cited

U.S. PATENT DOCUMENTS

| | | | |
|---|---|---|---|
| 3,146,495 | 9/1964 | Sanford | 425/380 |
| 3,193,879 | 7/1965 | Corbett | 425/466 |
| 3,321,805 | 5/1967 | Given | 425/72 R |
| 3,570,062 | 3/1967 | Dukert et al. | 425/326.1 |
| 3,709,645 | 1/1973 | Mraz | 425/467 |
| 3,756,758 | 9/1973 | Prall | 425/467 |
| 3,809,515 | 5/1974 | Farrell | 425/467 |
| 3,899,276 | 8/1975 | Sokolow | 425/467 |
| 4,045,154 | 8/1977 | Ratheiser | 425/467 |

Primary Examiner—Jeffery R. Thurlow
Attorney, Agent, or Firm—Charles A. Huggett; James F. Powers, Jr.; Ronald J. Cier

[57] ABSTRACT

There are disclosed improved die structures for the extrusion of a tubular sheet of thermoplastic film material. The die comprises a housing having an opening therethrough, a mandrel located in the opening and spaced from the wall thereof to form an annular conduit, and a base plate positioned at one end of the opening and attached to the housing. The mandrel is spaced from the base plate by a plurality of spacers and releasably connected thereto by attaching means extending through some or all of the spacers. Recesses are optionally provided in the immediate vicinity of each spacer to increase the volume of molten material flowing past the spacer.

2 Claims, 6 Drawing Figures

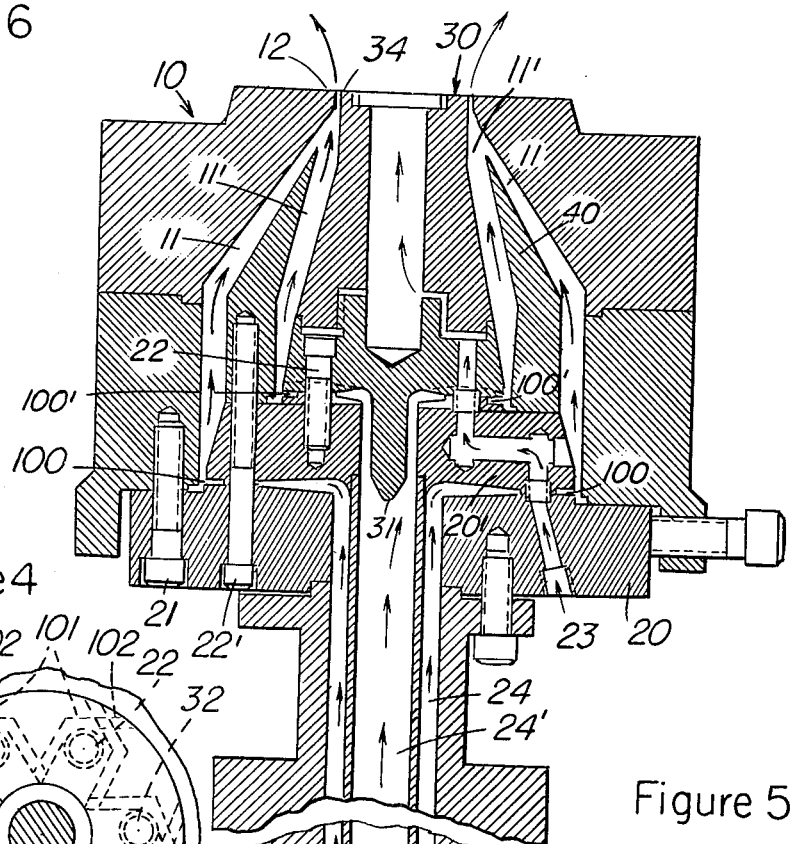
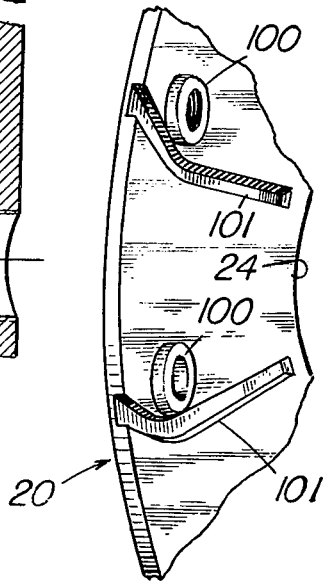
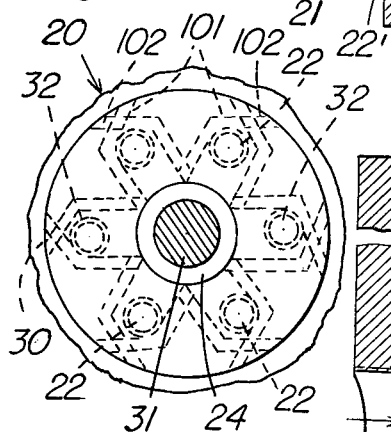
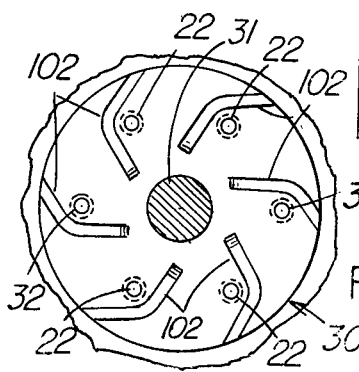

TUBULAR EXTRUSION DIE

This application is a continuation of Ser. No. 910,395 filed May 30, 1978 now abandoned.

BACKGROUND OF THE INVENTION

1. Field of the Invention

This invention relates to apparatus for extrusion of plastic sheet material, and in particular it relates to an improvement in the construction of annular dies for the extrusion of tubular thermoplastic film.

2. Description of the Prior Art

Tubular film extrusion dies have two basic structural components: an outer die body having a cylindrical opening, and a solid structure fitted within the cylindrical opening to provide a thin annular gap at the outlet end of the die. The ultimate die would have an internal structure and outer die lip which are machined to be perfectly round and an internal structure which would float within the cylindrical opening and be positioned in the exact center of the opening by some invisible force which could not obstruct or impede the flow of the molten extrudate thru the die.

In actual practice, however, the internal structure must be supported by some interconnecting support member which is sufficiently strong to enable the structure to withstand the force exerted by the flowing molten extrudate against it. the melt must part when going around the support structure or "spider", the rejoin prior to extrusion from the die. However, where the two streams rejoin there is a molecular discontinuity in the molten resin which results in a weak and noticeably visible weld line in the extruded tubular sheet. Further, the film gauge in the vicinity of the weld line is less than that of the remainder of the film. This is because the flow of the molten polymer in that area is impeded by two factors:

(1) it must travel a greater distance to detour around the support structure and back again; and (2) the melt flowing past the support is brought into contact with a larger wall area than is the melt which follows the less circuitous route, thereby encountering increased resistance to flow.

In the past, the visibility of the line has been minimized in some types of annular dies (e.g. the spiral die design) by making the two streams overlap at the point of rejoining so that the weld line runs diagonally to the surface of the film, but the reduction in film thickness in the vicinity of the weld has been more difficult to eliminate.

Two other important considerations in the construction of extrusion dies have been the purging characteristics of the die (which is of special concern when color changes are to be made in the extrudate from time to time) and the ease of cleaning. Both of these are functions of the mechanical structure of the die and are frequently found to be serious drawbacks in the more complex die designs which have attempted to alleviate the difficulties related to the aforementioned weld-line concerns.

SUMMARY OF THE INVENTION

The present invention is an improved extrusion die structure for the formation of tubular sheet material from molten thermoplastic resin. The die assembly comprises an outer body section or housing having an opening therethrough. The opening is preferably symmetrically formed about a longitudinal axis of the housing. A mandrel is located in the opening and spaced from the wall thereof to form an annular conduit between the wall and the mandrel. Positioned at one end of the opening in the housing is a base plate which is connected to the housing and which may, optionally, be releasably connected thereto. The mandrel is likewise connected to the base plate, preferably by releasable connection means, and is spaced from the base plate through the medium of a plurality of spacing means. The base plate further contains means for the introduction of molten thermoplastic material into the space between it and the mandrel and further means for passage of such molten material between it and the mandrel and around the plurality of spacing means to the annular conduit. Conventional film-forming means are positioned at the exit opening of the annular conduit—i.e. the end of the annular conduit which is remote from the base plate.

In further embodiment, there is at least one recess associated with each spacing means and formed in one or both of the surfaces comprising the walls of the passageway between the base plate and the mandrel and in the immediate vicinity of the associated spacing means. The purpose of the recesses is to increase the volume of molten thermoplastic material flowing past the spacing means and provide additional molten resin on the downstream side of the spacing means to compensate for the reduced flow in that area, thereby increasing the thickness of the extruded film in the area of the weld line. The recesses are preferably paired, two for each spacing means, and are constructed such that one of each pair of recesses channels molten resin in a clockwise direction around its respective spacing means while the second recess of the pair channels molten resin in a counter-clockwise direction around the opposite side of the spacer. If the downstream ends of the paired recesses are arranged in overlapping relationship the result will be a weld line which is diagonal to the surface of the extruded film and is significantly less noticeable than a weld line which is normal to the surface of the film.

In another embodiment, the mandrel may be connected to the housing structure and positioned within the opening therein by means of a plurality of radially extending spider legs. In such embodiment the aforementioned recesses for increasing the volume of flow molten polymer are formed in at least one wall surface in the immediate vicinity of each such spider leg and, optionally, means may be provided whereby the mandrel is releasably connected to the housing, for instance by bolts passing through one or more of the spider legs.

The preferred embodiments of the tubular extrusion die structure of the present invention have the additional advantage of being relatively easy to disassemble and clean, and, since they may be constructed from separate component parts, can easily be machined to provide smaller internal volumes and wall clearances than could the more complex prior art devices. As a result, embodiments of the present die structure have excellent purging characteristics and significantly reduced resin hold up, thereby facilitating resin color changes while reducing internal "dead spots" or areas where the resin can form pockets of reduced flow which consequently result in undesirable and difficult to remove carbon deposits on the inside of the die.

BRIEF DESCRIPTION OF THE DRAWING

Understanding of the present invention will be facilitated by reference to the attached drawings, in which:

FIG. 3 is a partial cross-sectional view, taken along line segment 3—3 of FIG. 1, showing the mandrel as viewed from below;

FIG. 4 is a partial cross-sectional view, taken along line segment 4—4 of FIG. 1, showing (in dotted outline) the overlapping arrangement of the supplementary feed grooves around the mandrel supporting members;

FIG. 5 is an enlarged detail of the base piece of FIG. 1, in perspective, showing the relationship of the support members with the supplementary feed grooves; and FIG. 6 is a cross-sectional elevation showing an embodiment of the present invention as it might be incorporated into the design of a coextrusion die for the extrusion of multi-layer films.

DESCRIPTION OF THE PREFERRED EMBODIMENTS

Figure 1:
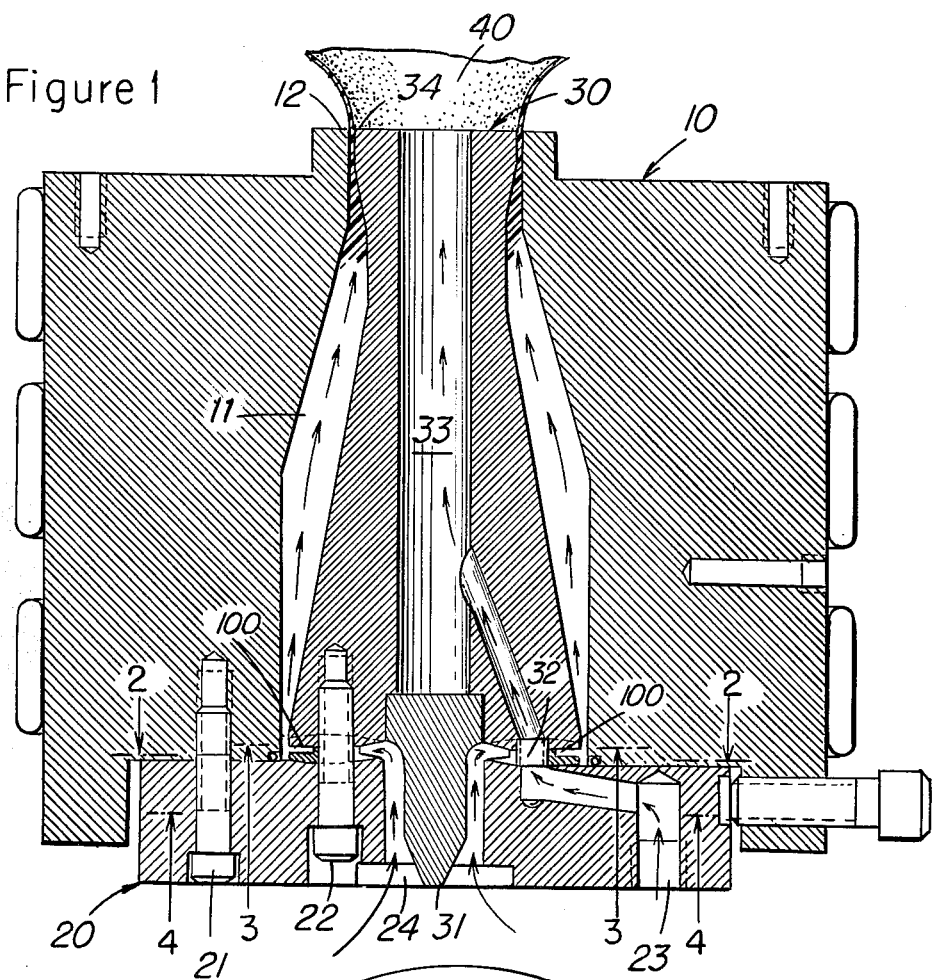
FIG. 1 is a cross-sectional elevational of one embodiment of the improved tubular extrusion die of the present invention.
Figure 2:
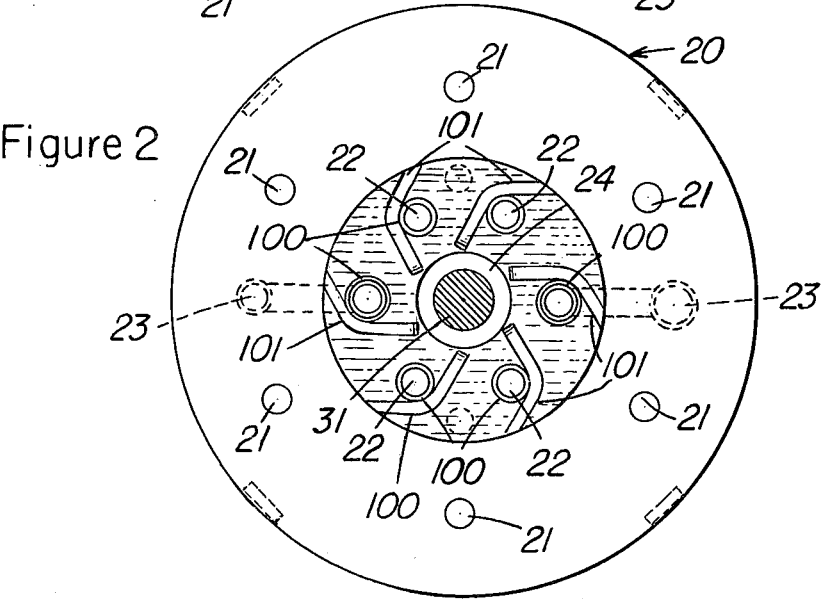
FIG. 2 is a cross-sectional top view taken along line segment 2—2 of FIG. 1 and showing the top surface of the base piece.

Referring to FIG. 1 of the drawings, which depicts one embodiment of invention in some of its preferred aspects, the basic components illustrated are the outer die body 10, the base piece 20 and the mandrel 30. Shown in connection with outer die body 10 are various heater bands, thermowells, adjustment screws and so forth which are useful adjuncts to a working die structure but do not form a necessary part of the present invention and are shown for the sake of completeness only. Those in the art will readily understand that these and other ancillary provisions are commonly incorporated into an operating extrusion die and their presence shall be assumed for the purposes of the following description.

The illustrated outer die body 10 is substantially cylindrical in shape and is releasably attached to the base piece 20 by means of heat-treated bolts 21, which are distributed about the base piece 10 in sufficient number and placement to enable the respective pieces to remain firmly attached and in alignment at normal operating pressures. An inlet port 24 creates a passageway thru base piece 20 and into the opening 11 in the outer die body 10, the inlet port 24 being substantially centered in the area traced on the upper face of base piece 20 by the internal walls of outer die body 10.

Mandrel 30 is positioned within opening 11 and is attached to base piece 20 by means of heat-treated bolts 22, thereby transforming opening 11 into an annular conduit. Center pin 31 is attached to the lower end portion of the mandrel and protrudes into inlet port 24 to create an annulus therein to enhance the uniform distribution of the molten resin throughout the die assembly as it enters inlet port 24 from the extruder (not shown). The die lips 12 (on the upper portion of the internal wall of outer die body 10) and 34 (on the upper portion of mandrel 30) are machined to a substantially perfectly round configuration and are dimensioned to close tolerance to provide a finite annular gap thru which the molten resin is extruded to form tubular film 40.

Provided in the base piece 20 are one or more passages 23 which function as conduits for the admission of a conventional bubble inflating gas. The gas proceeds thru passage 23, to interconnecting passage 32 in the mandrel, and then into passage 33, thu the mandrel and into the center of tubular film 40 to inflate and stretch the tube 40 in the conventional manner.

In the upper surface of base piece 20 or, alternately, in the lower surface of mandrel 30, are a mulitplicity of protrusions 100 disposed around the inlet port 24. Theseprotrusions or spacing means elevate the mandrel above the surface of the base piece 20 and provide a passageway for the flow of molten resin from the inlet port 24 to annular conduit 11. The bolts 22, which fasten the mandrel to the base piece, would normally pass thru some or all of the protrusions 100. Also, one or more of the protrusions 100 would normally serve as the interconnecting link between the inflating gas passages 23 and 32, when such passages are present, with one such protrusion linking each pair of passages. The number and placement of protrusions 100 is not fixed and will be determined largely by the requirements of the specific die structure involved, especially the size of the die and its material of construction taken together with consideration of the internal pressures the die structure would normally be expected to withstand.

Referring now to FIG. 5 of the drawings, we see an enlarged detail of the base piece 20 showing the protrusions 100. The protrusions are shown as being hollow to allow passage of bolts 22 therethru, but it is to be understood that they may be solid if desired, the allowance for bolts 22 being merely a convenience when such bolts are the means chosen to hold the mandrel in place and align it within the opening in outer die body 10. Likewise, as mentioned above, the protrusions may be placed in the bottom surface of the mandrel piece, such protrusions serving primarily as spacers to elevate the mandrel above the base piece and it being of only minor concern whether the mandrel is resting on the spacers or the spacers attached to the mandrel and resting on the base piece. Alternately, both surfaces may be smooth and substantially without protrusions with the spacing means comprising separate rings or discs which are positioned between the adjacent surfaces to separate them. In either event, when the mandrel is attached to the base piece, the spacing means maintain the adjacent surfaces of the two pieces in spaced relationship such that slot-like openings are formed between the spacers to allow for passage of molten polymer from the inlet port 24, under the mandrel and into annular conduit 11.

A groove or channel 101 is formed in the base piece extending from the region of the resin inlet port 24 to the peripheral area of the base piece 20 in front of the spacer 100. The channel is preferably curved, extending from the region directly behind the spacing structure, (i.e. the upstream side) around the side of it and back in front (i.e. the downstream side) to deliver additional molten resin to the area obstructed by the spacing means. One such supplementary feed channel 101 is provided in the base plate for each spacing means 100. A second series of channels 102 are provided in the underside of mandrel 30, the channels 102 being curved in the opposite direction of the curvature of channels 101 and placed so as to circumnavigate the opposite side of the spacing means. Both channels 101 and 102 deliver supplemental molten resin to the downstream side of the spacers 100 and, preferably, the downstream ends of the channels 101 and 102 are in overlapping relationship, as can be seen in FIG. 4. In alternate arrangements either the channels 101 or the channels 102 may be omitted, thereby providing only a single supplementary feed channel for each spacer, or both channels may be in the same surface, which surface may comprise the underside of mandrel 30, the upper surface of base piece 20, or both.

The die structure of the present invention has the advantage of providing improved gauge uniformity. Flow variation of the molten resin in the area of the spider legs can be fully compensated by mathematically and experimentally optimizing the depth and width of the feed grooves, relative to the size of the slot between the support members, so that there is no gauge variation at the area of the weld line.

The structure has the further advantage of extruding tubular sheet material without noticeably visible weld lines. When the downstream ends of the channels 101 and 102 are in overlapping relationship the weld lines are lapped diagonally through the film cross-section so that they are not readily noticeable in the extruded film.

Additionally, the die structure of this invention has the advantage of ease of cleaning. A preferred embodiment of the die assembly has demountable structural components which can be readily disassembled. When taken apart, the "spider area" is fully exposed and can be cleaned with a wire brush.

The internal volumes of the die can be made very small and, due to the supplementary feed grooves, are relatively free of dead areas so that the die has unusually good purging characteristics. This results in desirably fast purging of the die, which is particularly important when changing resin color or composition.

FIG. 6 of the drawings illustrates an embodiment of the present invention adapted to extrude a tubular sheet of film which is a laminate of two layers of molten resin. The layers may be of the same or different compositions and may be of the same or different relative thicknesses, those characteristics being normal end-product considerations and the techniques for achieving such effects being within the knowledge of those skilled in the art.

Although the present invention has been described with reference to specific embodiments and specific means for structuring such embodiments, it will be readily apparent to those skilled in the art that numerous changes and modifications of the embodiments and structuring means may be made without departing from the spirit of this disclosure. It is to be understood that such changes and modifications are considered to be within the purview and scope of the appended claims.

I claim:

1. A die for extruding a tubular sheet of thermoplastic film material comprising:
    (a) a housing having a longitudinal opening therethrough defining a first axis;
    (b) an elongated mandrel positioned within said housing opening and spaced therefrom to form an annular conduit extending in the direction of said axis;
    (c) a base plate connected to said housing at the upstream end thereof;
    (d) a plurality of means for spacing said mandrel from said base plate to provide a space therebetween, each of said spacing means having an axis parallel to said first axis whereby said mandrel and said base plate have spaced apart juxtaposition walls extending radially from said first axis and in communication with said annular conduit;
    (e) each of said spacing means having a first groove formed in one of said mandrel and said base plate walls extending substantially radially from said first axis to one side of said one of said spacing means and tangentially from said one of said spacing means, each of said spacing means having a second groove formed in one of said mandrel and said base plate walls extending substantially radially from said first axis to another side of said spacing means and tangentially from said spacing means, whereby the tangential extensions of each one of said grooves intersect; and
    (f) means for introducing molten thermoplastic material through said base plate into said space between said mandrel and said base plate whereby such thermoplastic material flows radially outwardly from said first axis to said annular conduit.

2. The die of claim 1 wherein one of said first and second grooves is formed in one of said base plate and mandrel walls and said other of said first and second grooves is formed in the other of said base plate and mandrel walls.

* * * * *